(12) United States Patent
Liang et al.

(10) Patent No.: US 10,788,854 B1
(45) Date of Patent: Sep. 29, 2020

(54) CLAMSHELL ELECTRONIC DEVICE

(71) Applicant: Wistron Corp., New Taipei (TW)

(72) Inventors: Chen Yi Liang, New Taipei (TW); Chen-Wen Liu, New Taipei (TW); Ming-Ju Hsieh, New Taipei (TW); Tzu Yuan Tseng, New Taipei (TW); Chun Yi Lu, New Taipei (TW); Ko-Chen Chang, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/521,455

(22) Filed: Jul. 24, 2019

(30) Foreign Application Priority Data

Mar. 7, 2019 (TW) .............................. 108107547 A

(51) Int. Cl.
*G06F 1/16* (2006.01)
(52) U.S. Cl.
CPC .......... *G06F 1/1616* (2013.01); *G06F 1/1681* (2013.01)
(58) Field of Classification Search
CPC .............................. G06F 1/1616; G06F 1/1681
See application file for complete search history.

(56) References Cited

U.S. PATENT DOCUMENTS

| | | | | |
|---|---|---|---|---|
| 6,404,623 B1 * | 6/2002 | Koshika | ................ | G06F 1/1616 345/87 |
| 6,744,623 B2 * | 6/2004 | Nunnano | .............. | G06F 1/1632 345/87 |
| 7,110,248 B2 * | 9/2006 | Weng | .................... | G06F 1/1616 361/679.27 |
| 8,106,887 B2 * | 1/2012 | Park | .................... | H04M 1/0214 345/168 |
| 8,270,149 B2 | 9/2012 | Hanson et al. | | |
| 9,501,097 B2 * | 11/2016 | Moser | ................... | G06F 1/1616 |
| 10,254,803 B1 * | 4/2019 | Quinn | ................... | G06F 1/1688 |
| 2001/0055197 A1 * | 12/2001 | Agata | ................... | G06F 1/1679 361/679.05 |
| 2003/0105892 A1 | 6/2003 | Numano et al. | | |
| 2010/0067181 A1 * | 3/2010 | Bair | ....................... | G06F 3/0426 361/679.3 |
| 2012/0068940 A1 * | 3/2012 | Wang | .................... | G06F 1/3203 345/173 |

(Continued)

FOREIGN PATENT DOCUMENTS

| | | |
|---|---|---|
| CN | 103105892 A | 5/2013 |
| CN | 103270505 A | 8/2013 |

*Primary Examiner* — Hoa C Nguyen
*Assistant Examiner* — Keith DePew

(57) ABSTRACT

A clamshell electronic device is provided. The clamshell electronic device includes a device body, a cover, an auxiliary display unit and an orientation adjustment mechanism. The cover pivots on the device body, and the cover includes a cover notch. The auxiliary display unit is disposed on the device body, wherein the auxiliary display unit is adapted to be rotated between a first unit orientation and a second unit orientation. The orientation adjustment mechanism is connected to the cover and the auxiliary display unit, wherein when the cover is in a first cover orientation relative to the device body, the cover covers the device body, and the auxiliary display unit is in the first unit orientation and corresponds to the cover notch.
The user can obtain information such as time, weather or messages directly via the auxiliary display unit in the the cover notch.

11 Claims, 17 Drawing Sheets

D1

(56) References Cited

U.S. PATENT DOCUMENTS

| | | | |
|---|---|---|---|
| 2012/0099254 A1* | 4/2012 | Rogers | G06F 1/1637 361/679.01 |
| 2012/0274565 A1* | 11/2012 | Moser | G06F 1/1662 345/168 |
| 2015/0234433 A1* | 8/2015 | Huang | G06F 1/1652 361/679.26 |
| 2015/0346770 A1* | 12/2015 | Onda | G06F 1/1626 361/679.06 |
| 2017/0251087 A1* | 8/2017 | Lumbard | G06F 1/165 |
| 2018/0188774 A1* | 7/2018 | Ent | G06F 1/1618 |
| 2018/0210504 A1* | 7/2018 | Moser | G06F 1/1616 |
| 2018/0373292 A1* | 12/2018 | Perelli | G06F 1/165 |

* cited by examiner

CLAMSHELL ELECTRONIC DEVICE

CROSS REFERENCE TO RELATED APPLICATIONS

This Application claims priority of Taiwan Patent Application No. 108107547, filed on Mar. 7, 2019, the entirety of which is incorporated by reference herein.

BACKGROUND OF THE INVENTION

Field of the Invention

The present invention relates to a clamshell electronic device, and in particular to a clamshell electronic device with an auxiliary display unit.

Description of the Related Art

The display of a conventional notebook is only disposed on the cover. When the cover of the notebook is closed, the display faces the keyboard, and the user cannot obtain information from the display. However, as notebooks perform an increased number of functions, the user may need to directly obtain such information as the time, weather, or messages from the notebook, even when the cover is closed.

BRIEF SUMMARY OF THE INVENTION

In one embodiment, a clamshell electronic device is provided. The clamshell electronic device includes a device body, a cover, an auxiliary display unit and an orientation adjustment mechanism. The cover pivots on the device body, and the cover includes a cover notch. The auxiliary display unit is disposed on the device body, wherein the auxiliary display unit is adapted to be rotated between a first unit orientation and a second unit orientation. The orientation adjustment mechanism is connected to the cover and the auxiliary display unit, wherein when the cover is in a first cover orientation relative to the device body, the cover covers the device body, and the auxiliary display unit is in the first unit orientation and corresponds to the cover notch. While the cover is being rotated relative to the device body from the first cover orientation to a second cover orientation, the orientation adjustment mechanism rotates the auxiliary display unit to the second unit orientation.

Utilizing the clamshell electronic device of the embodiment of the invention, when the cover is closed, the user can obtain such information as the time, weather or messages from the auxiliary display unit in the cover notch. Additionally, when the cover is opened (for example, the cover is in the second cover orientation relative to the device body), the user can also obtain such information as the time, weather or messages directly from the auxiliary display unit without switching the windows in the screen.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
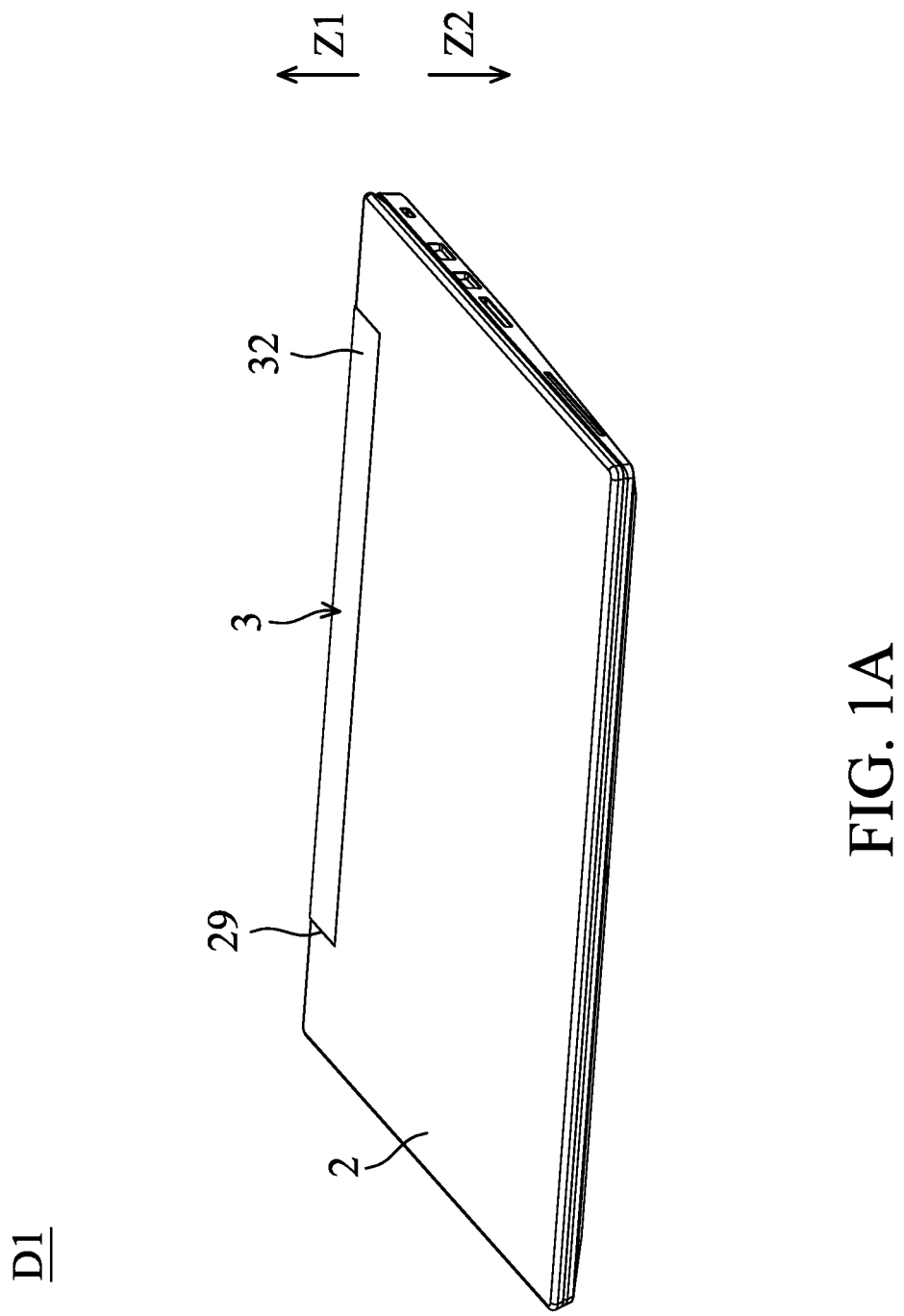
FIG. 1A shows a clamshell electronic device of a first embodiment of the invention, wherein a cover is in a first cover orientation relative to a device body.
Figure 1B:
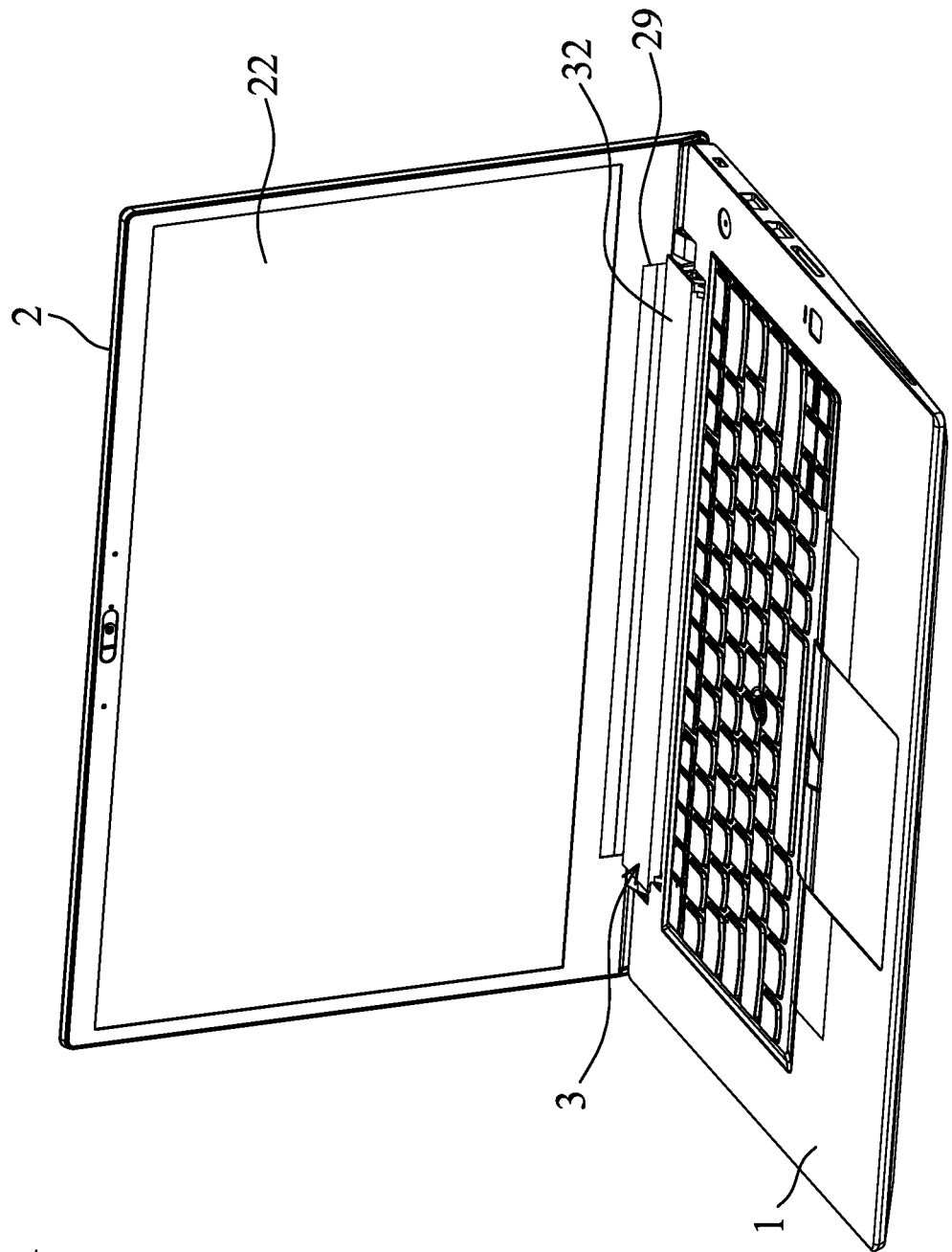
FIG. 1B shows the clamshell electronic device of the first embodiment of the invention, wherein the cover is in a third cover orientation relative to the device body.
Figure 1C:
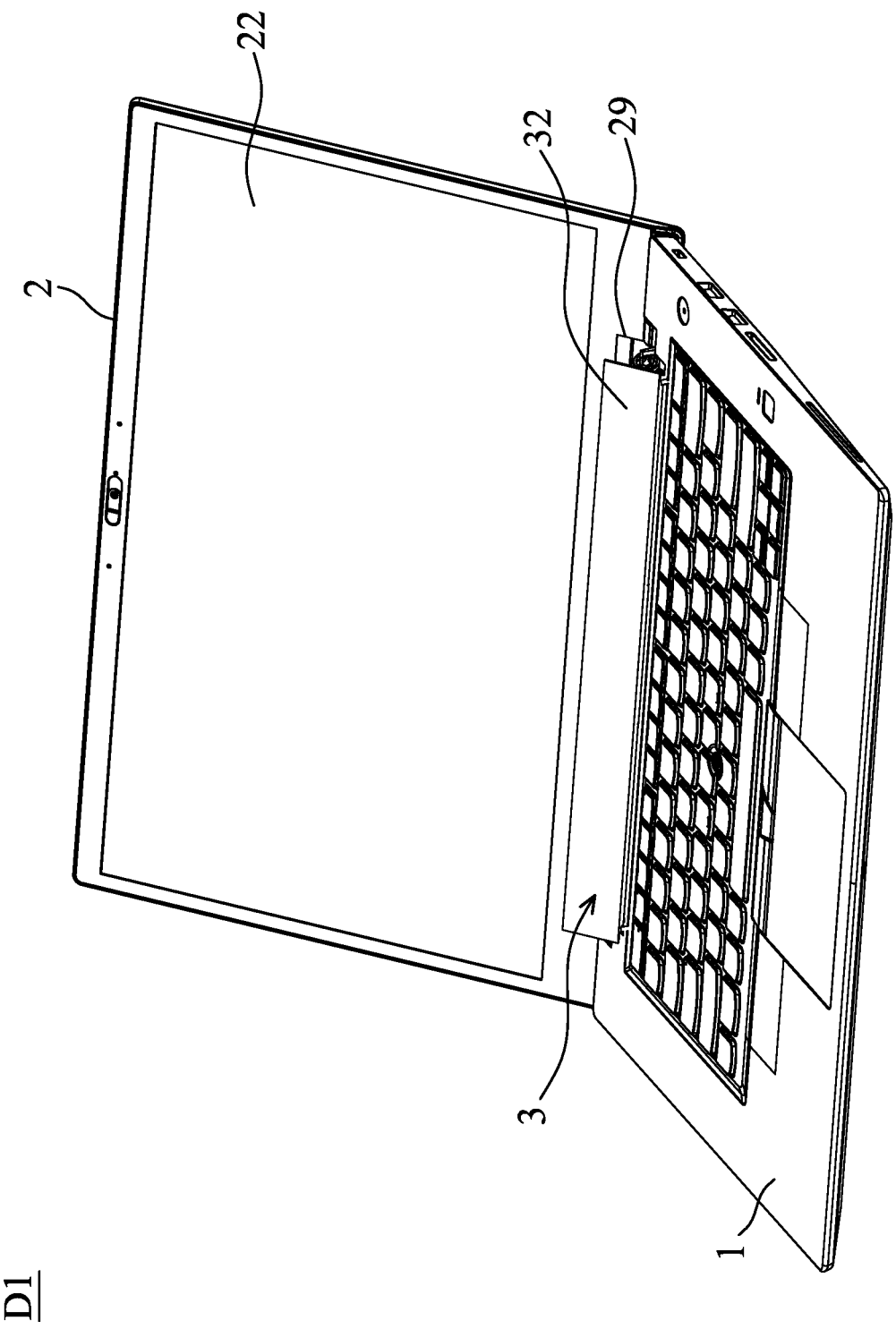
FIG. 1C shows the clamshell electronic device of the first embodiment of the invention, wherein the cover is in a second cover orientation relative to the device body.

FIGS. 1A, 1B and 1C show a clamshell electronic device D1 of a first embodiment of the invention. The clamshell electronic device D1 includes a device body 1, a cover 2, an auxiliary display unit 3 and an orientation adjustment mechanism 401 (not shown). The cover 2 pivots on the device body 1, and the cover 2 includes a cover notch 29. The auxiliary display unit 3 is disposed on the device body 1. The auxiliary display unit 3 is adapted to be rotated between a first unit orientation (FIGS. 1A and 1B) and a second unit orientation (FIG. 1C). Particularly, in one embodiment, the auxiliary display unit 3 pivots on the device body 1. The orientation adjustment mechanism 401 (not shown) is connected to the cover 2 and the auxiliary display unit 3. When the cover 2 is in a first cover orientation (FIG. 1A) relative to the device body 1, the cover 2 covers the device body 1, and the auxiliary display unit 3 is in the first unit orientation and corresponds to the cover notch 29. While the cover 2 is being rotated relative to the device body 1 from the first cover orientation (FIG. 1A) to a second cover orientation (FIG. 1C), the orientation adjustment mechanism 401 (not shown) rotates the auxiliary display unit 3 to the second unit orientation.

In one embodiment, the clamshell electronic device can be a notebook or another electronic device with a clamshell structure.

With reference to FIGS. 1A, 1B and 1C, in one embodiment, while the cover 2 is being rotated relative to the device body 1 from the first cover orientation (FIG. 1A) to the second cover orientation (FIG. 1C), the cover 2 moves the orientation adjustment mechanism 401 (not shown), and the orientation adjustment mechanism 401 (not shown) rotates the auxiliary display unit 3 to the second unit orientation (FIG. 1C).

With reference to FIGS. 1A, 1B and 1C, in one embodiment, while the cover 2 is being rotated relative to the device body 1 from the first cover orientation (FIG. 1A) to a third cover orientation (FIG. 1B), the auxiliary display unit 3 is not rotated by the orientation adjustment mechanism 401 (not shown). While the cover 2 is being rotated relative to the device body 1 from the third cover orientation (FIG. 1B) to the second cover orientation (FIG. 1C), the orientation adjustment mechanism 401 (not shown) rotates the auxiliary display unit 3 to the second unit orientation, wherein the third cover orientation is located between the first cover orientation and the second cover orientation.

With reference to FIGS. 1A, 1B and 1C, in one embodiment, the auxiliary display unit 3 includes an auxiliary display 32. The cover 2 includes a main display 22. When the cover 2 is in the first cover orientation relative to the device body 1, the auxiliary display 32 faces a first direction Z1, the main display 22 faces a second direction Z2, and the first direction Z1 is opposite to the second direction Z2. When the auxiliary display unit 3 is in the first unit orientation (FIGS. 1A and 1B), the auxiliary display 32 can show information such as weather, temperature, the time, and e-mail, and the user can obtain the information without opening the cover of the notebook. When the auxiliary display unit 3 is in the second unit orientation (FIG. 1C), the auxiliary display 32 can show the same image of with the main display 22, or show different image from the main display 22. The auxiliary display 32 can also be a touch panel. The disclosure is not meant to restrict the invention.

Figure 2A:
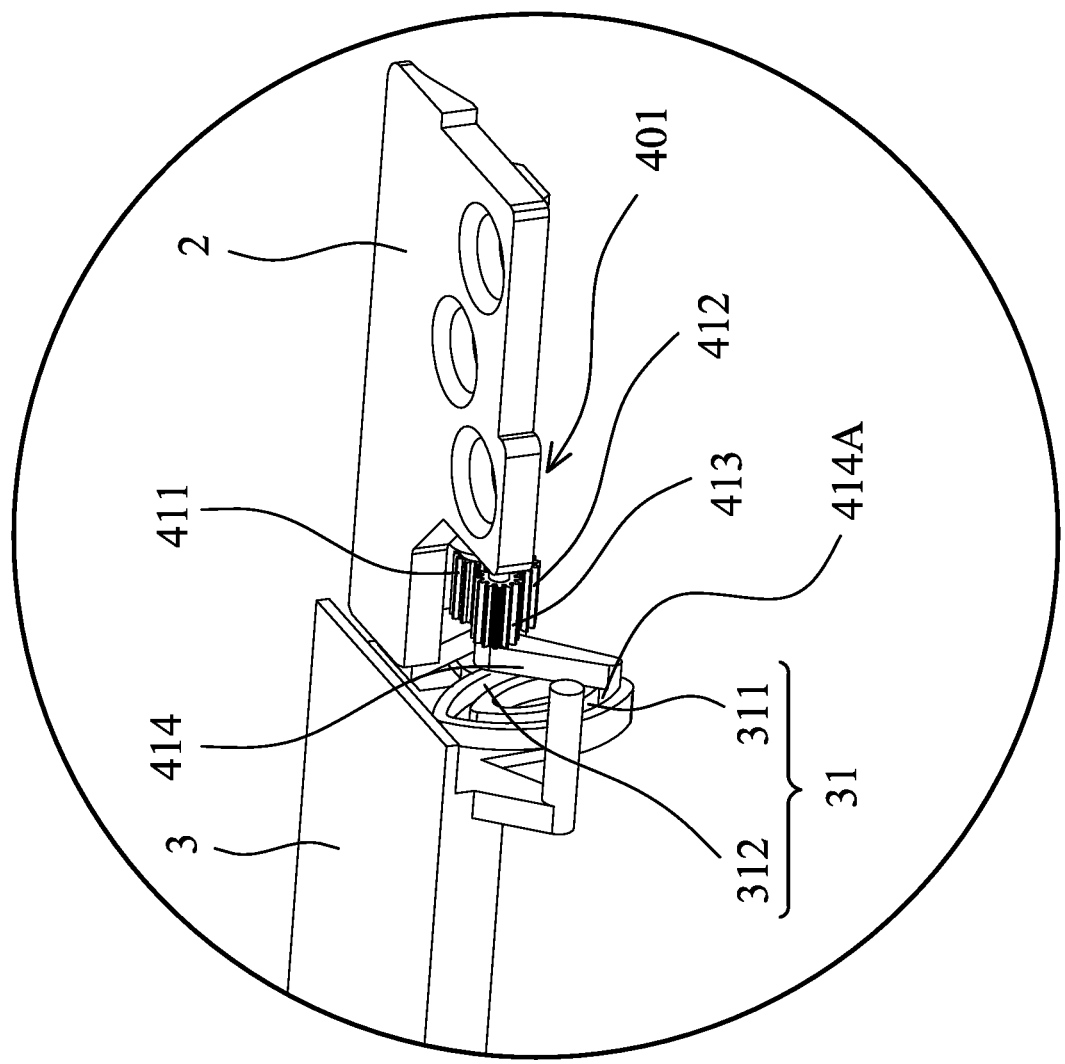
FIG. 2A shows details of the orientation adjustment mechanism of the first embodiment of the invention, wherein the cover is in the first cover orientation relative to the device body.
Figure 2B:
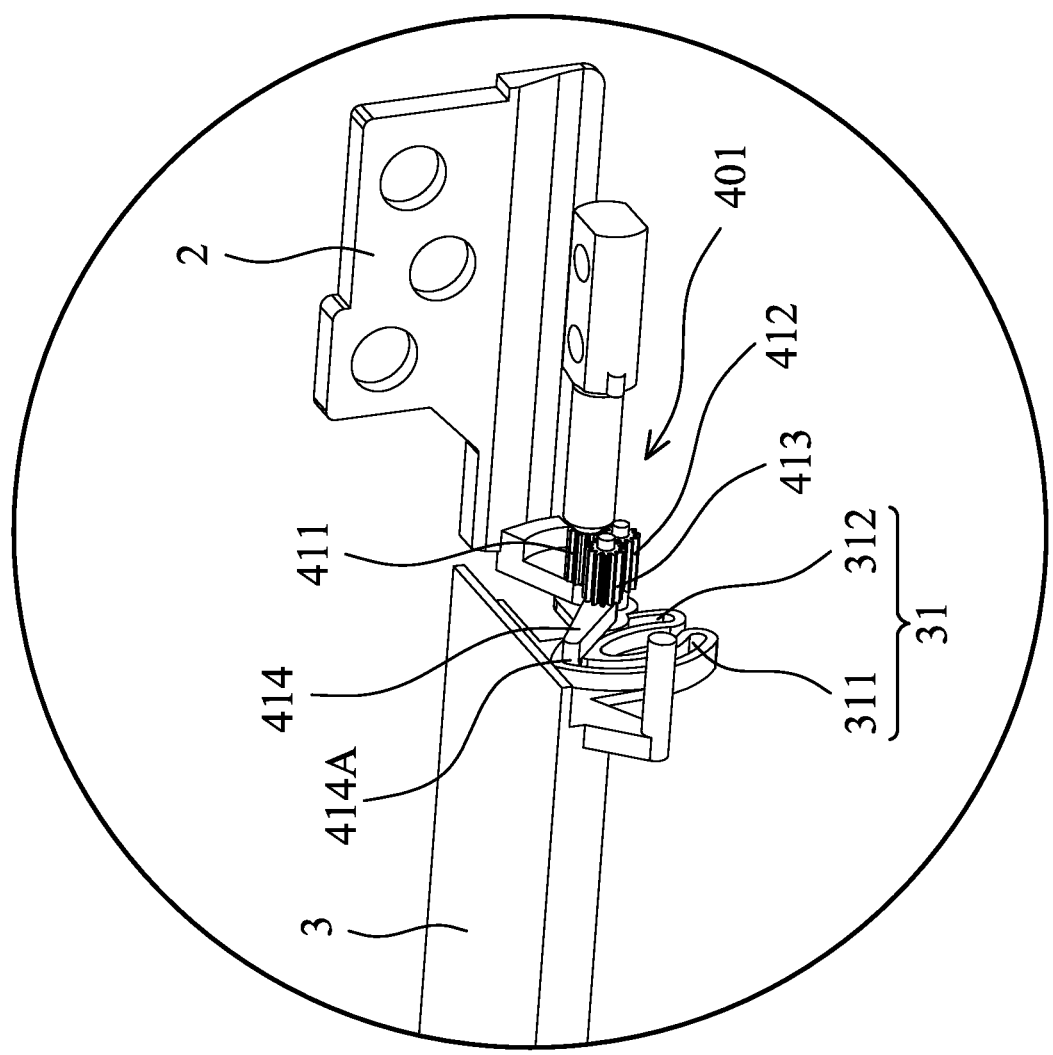
FIG. 2B shows details of the orientation adjustment mechanism of the first embodiment of the invention, wherein the cover is in the third cover orientation relative to the device body.
Figure 2C:
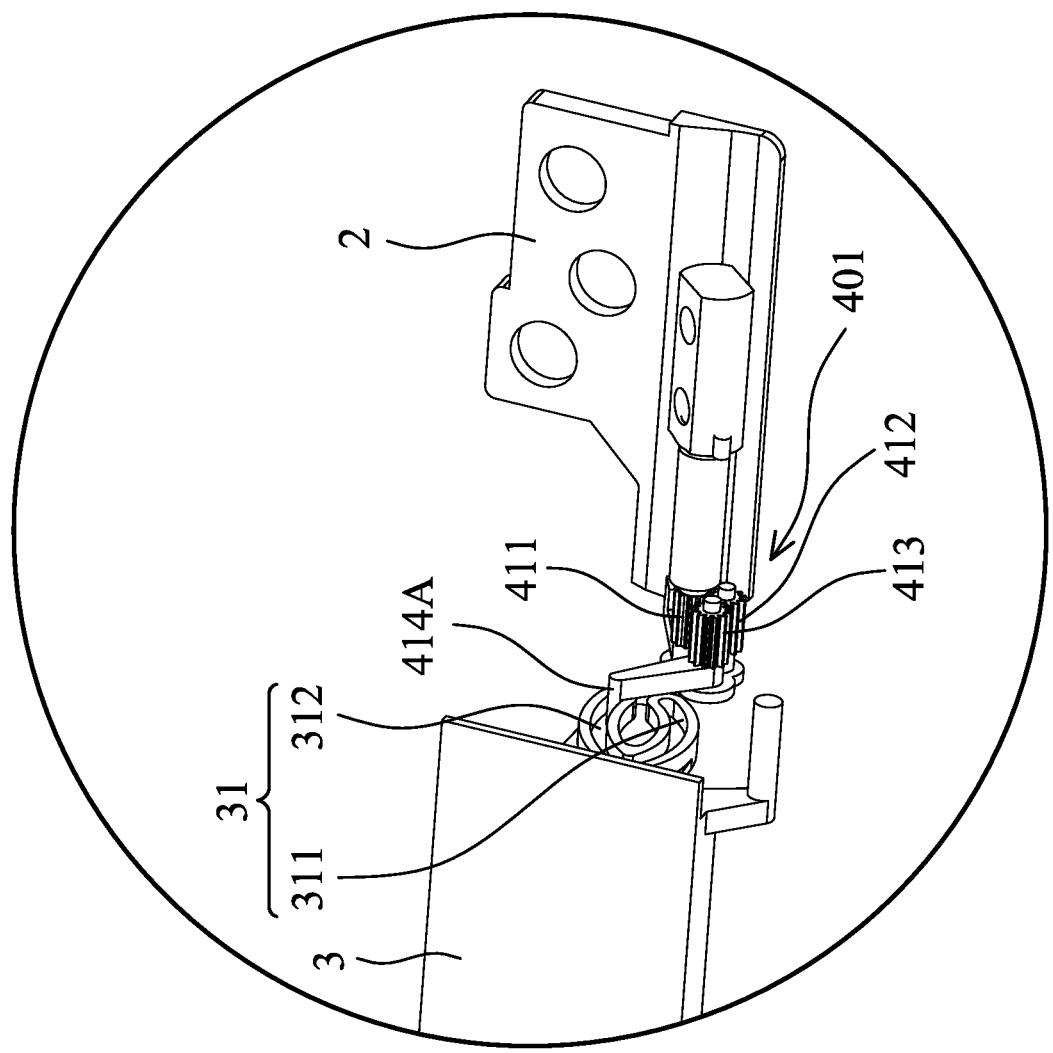
FIG. 2C shows details of the orientation adjustment mechanism of the first embodiment of the invention, wherein the cover is in the second cover orientation relative to the device body.

FIGS. 2A, 2B and 2C show the orientation adjustment mechanism 401 of the first embodiment of the invention. With reference to FIGS. 2A, 2B and 2C, in this embodiment, the orientation adjustment mechanism 401 includes a first gear 411, a second gear 412, a third gear 413 and a linkage 414. The auxiliary display unit 3 includes a unit slot 31. The cover 2 moves the first gear 411, the first gear 411 rotates the second gear 412, the second gear 412 rotates the third gear 413, and the third gear 413 moves the linkage 414. The linkage 414 includes a post 414A, and the post 414A is inserted into the unit slot 31.

With reference to FIGS. 2A, 2B and 2C, in this embodiment, the unit slot 31 includes a first slot section 311 and a second slot section 312. While the cover 2 is being rotated relative to the device body 1 from the first cover orientation (FIG. 2A) to the third cover orientation (FIG. 2B), the post 414A is moved in the first slot section 311, and the auxiliary display unit 3 is not pushed by the post 414A yet. While the cover 2 is being rotated relative to the device body 1 from the third cover orientation (FIG. 2B) to the second cover orientation (FIG. 2C), the post 414A is moved in the second slot section 312 and pushes the second slot section 312 to rotate the auxiliary display unit 3 to the second unit orientation.

Figure 2D:
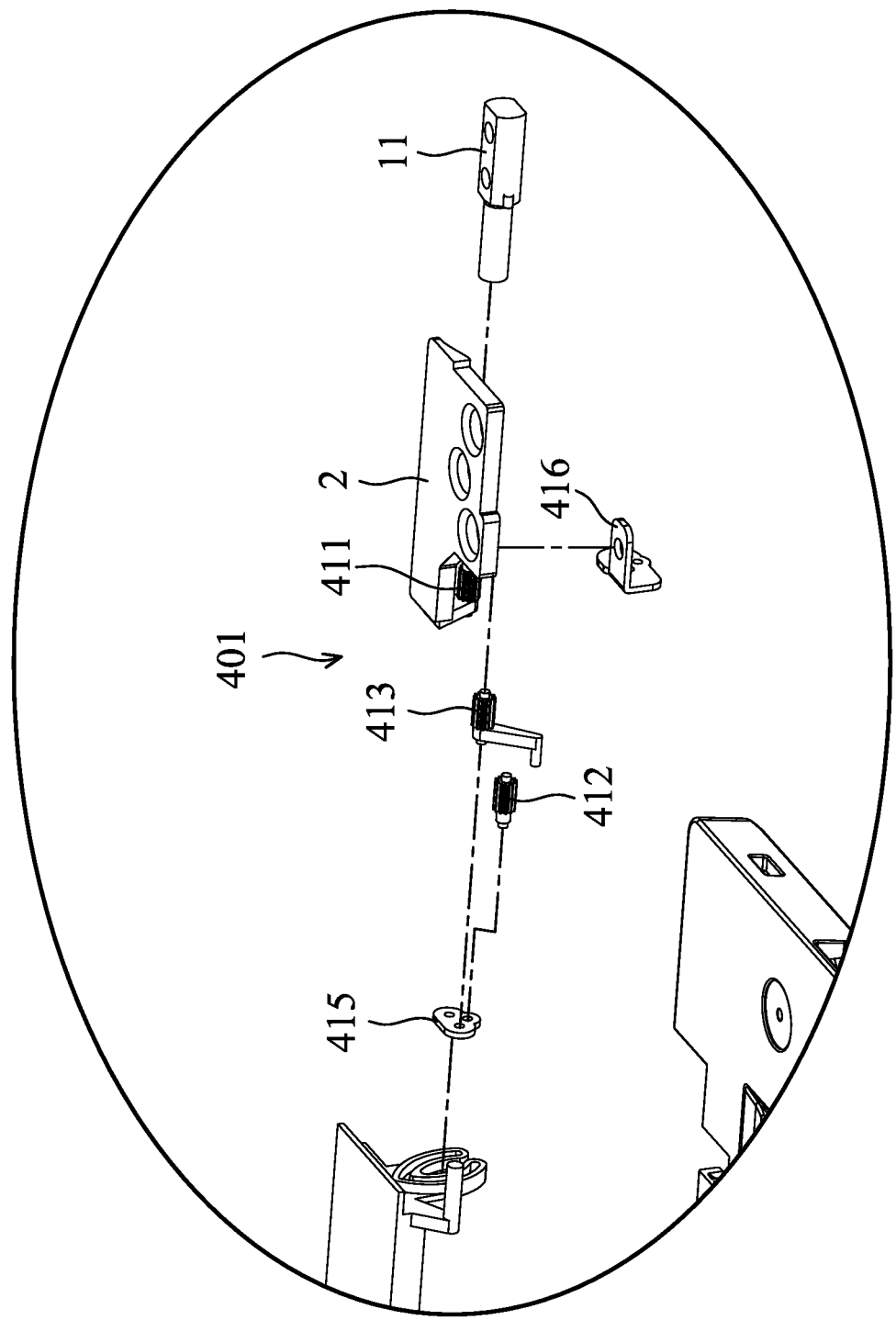
FIG. 2D is an exploded view of the orientation adjustment mechanism of the first embodiment of the invention.
Figure 2E:
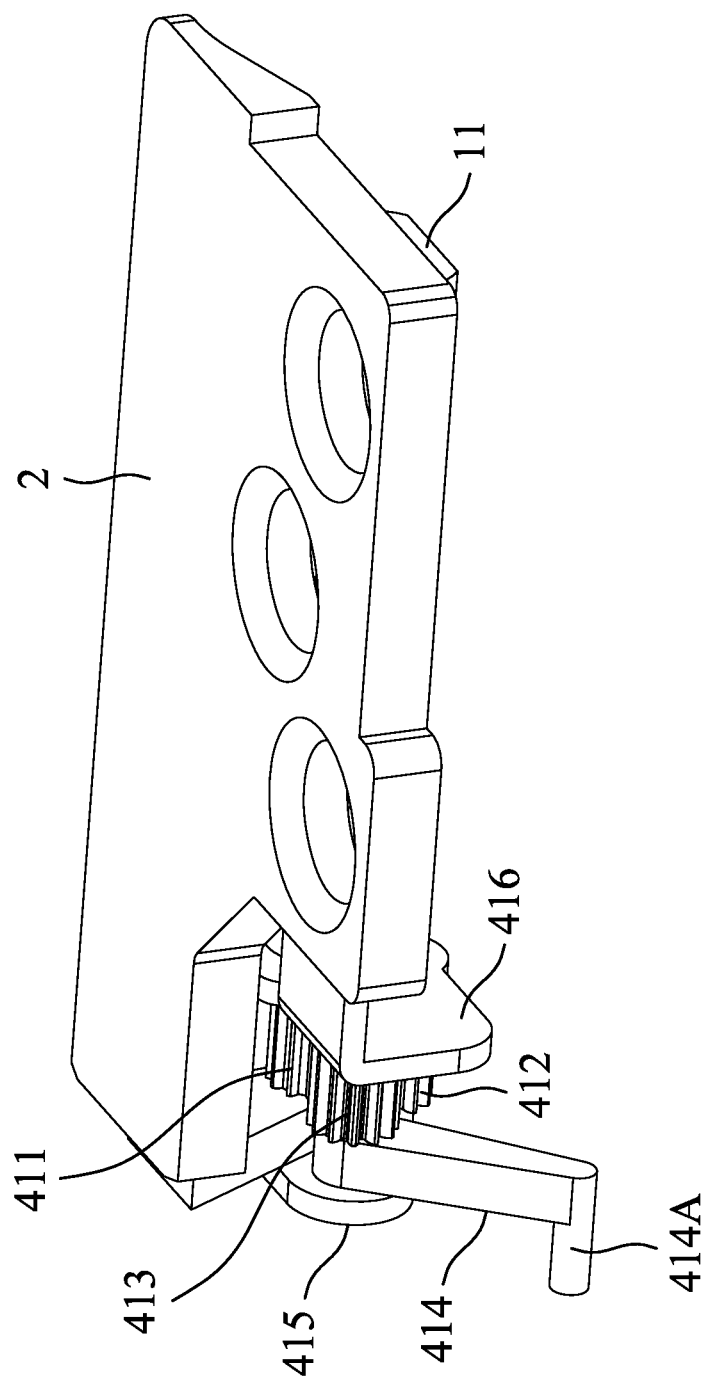
FIG. 2E is an assembled view of the orientation adjustment mechanism of the first embodiment of the invention.

With reference to FIGS. 2D and 2E, in one embodiment, the orientation adjustment mechanism 401 further includes a connection plate 415 and a transmission plate 416. The first gear 411, the second gear 412 and the third gear 413 are connected to the connection plate 415. The connection plate 415 positions the first gear 411, the second gear 412 and the third gear 413. The device body 1 includes a shaft 11. The shaft 11 pivots on the first gear 411. The cover 2 is connected to the transmission plate 416. The transmission plate 416 is connected to the first gear 411 and rotates the first gear 411.

Figure 3A:
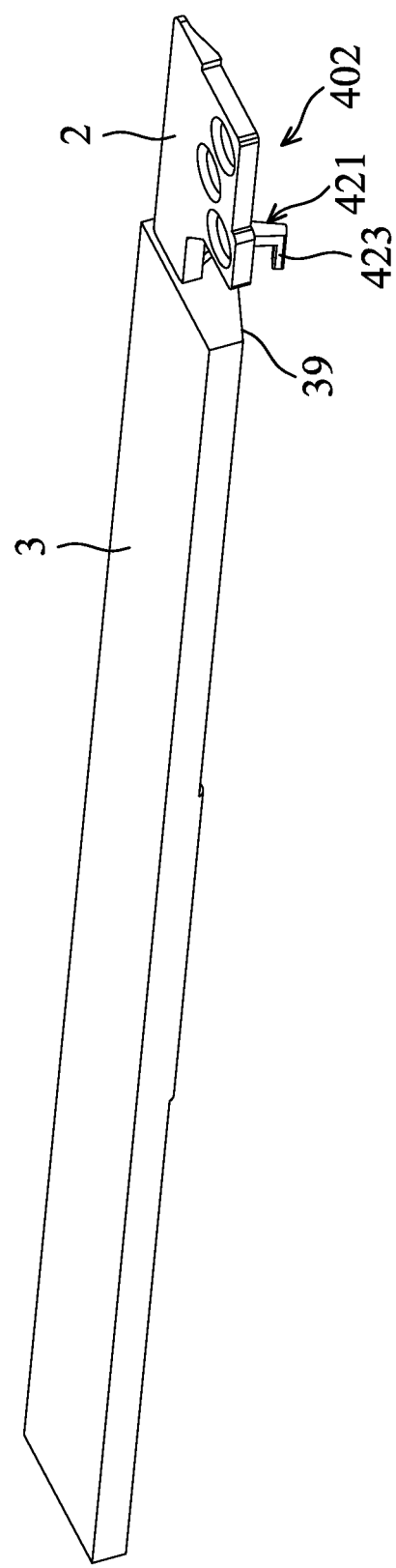
FIG. 3A shows details of the orientation adjustment mechanism of the second embodiment of the invention, wherein the cover is in the first cover orientation relative to the device body.
Figure 3B:
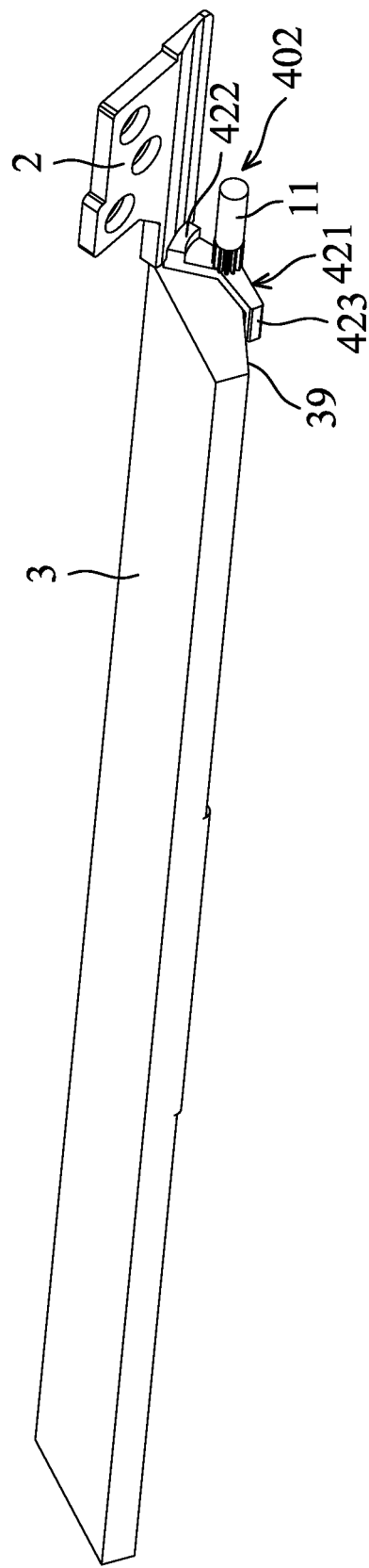
FIG. 3B shows details of the orientation adjustment mechanism of the second embodiment of the invention, wherein the cover is in the third cover orientation relative to the device body.
Figure 3C:
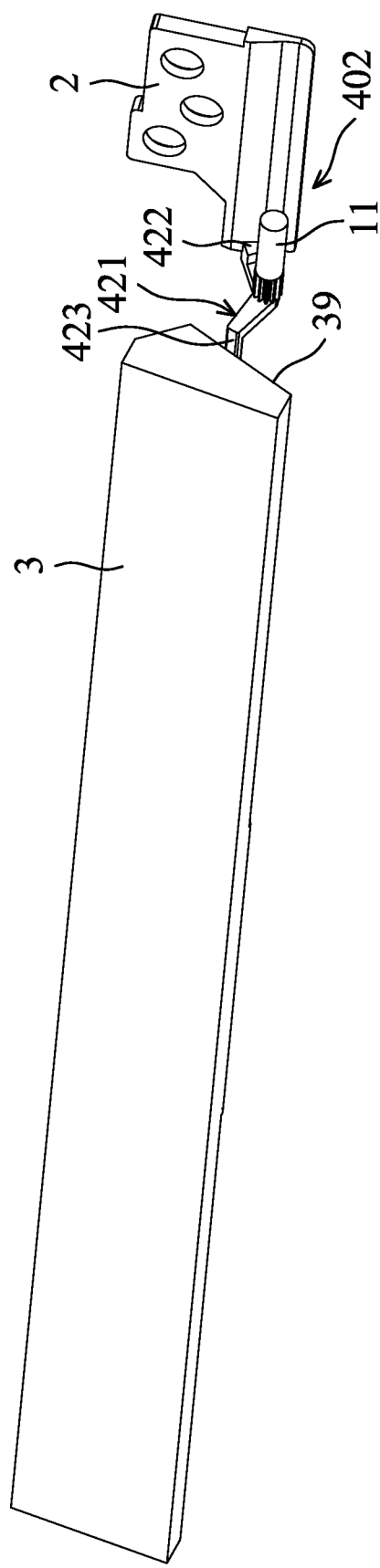
FIG. 3C shows details of the orientation adjustment mechanism of the second embodiment of the invention, wherein the cover is in the second cover orientation relative to the device body.

FIGS. 3A, 3B and 3C show an orientation adjustment mechanism 402 of a second embodiment of the invention. With reference to FIGS. 3A, 3B and 3C, in this embodiment, the orientation adjustment mechanism 402 includes a pushing rod 421. The device body 1 includes a shaft 11. The pushing rod 421 pivots on the shaft 11. The pushing rod 421 includes a pushing rod connection end 422 and a pushing rod abutting end 423. The pushing rod connection end 422 is affixed to the cover 2, and the pushing rod abutting end 423 is adapted to push the auxiliary display unit 3.

With reference to FIGS. 3A, 3B and 3C, in this embodiment, the auxiliary display unit 3 includes a unit surface 39. While the cover 2 is being rotated relative to the device body 1 from the first cover orientation (FIG. 3A) to the third cover orientation (FIG. 3B), the pushing rod abutting end 423 is separated from the unit surface 39, and the auxiliary display unit 3 is therefore not pushed by the pushing rod abutting end 423. While the cover 2 is being rotated relative to the device body 1 from the third cover orientation (FIG. 3B) to the second cover orientation (FIG. 3C), the pushing rod abutting end 423 abuts the unit surface 39 and pushes the unit surface 39 to rotate the auxiliary display unit 3 to the second unit orientation.

Figure 4A:
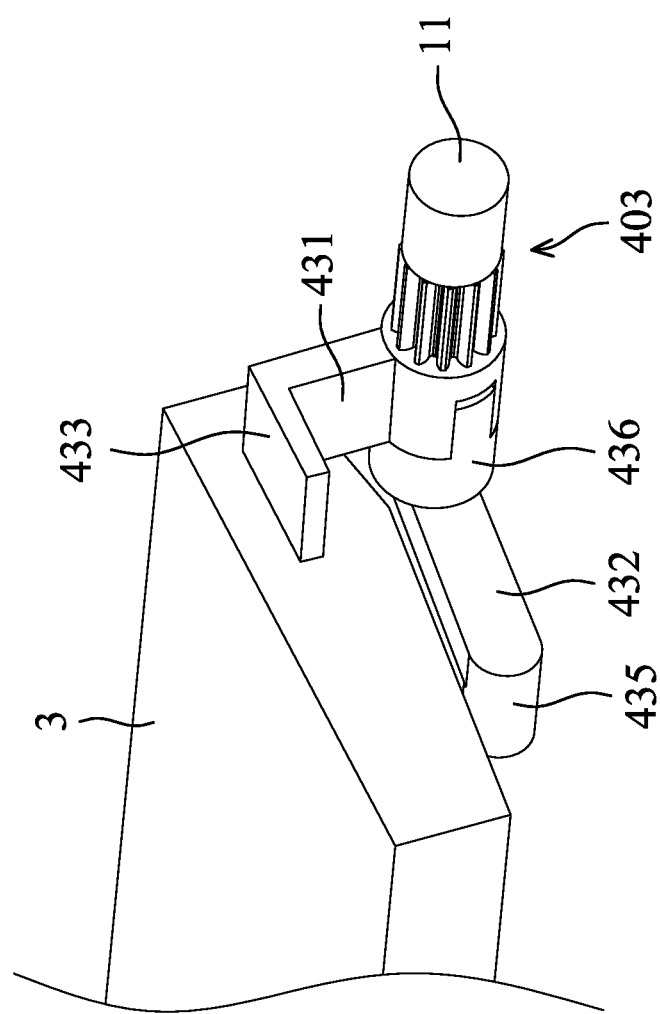
FIG. 4A shows details of the orientation adjustment mechanism of the third embodiment of the invention, wherein the cover is in the first cover orientation relative to the device body.
Figure 4B:
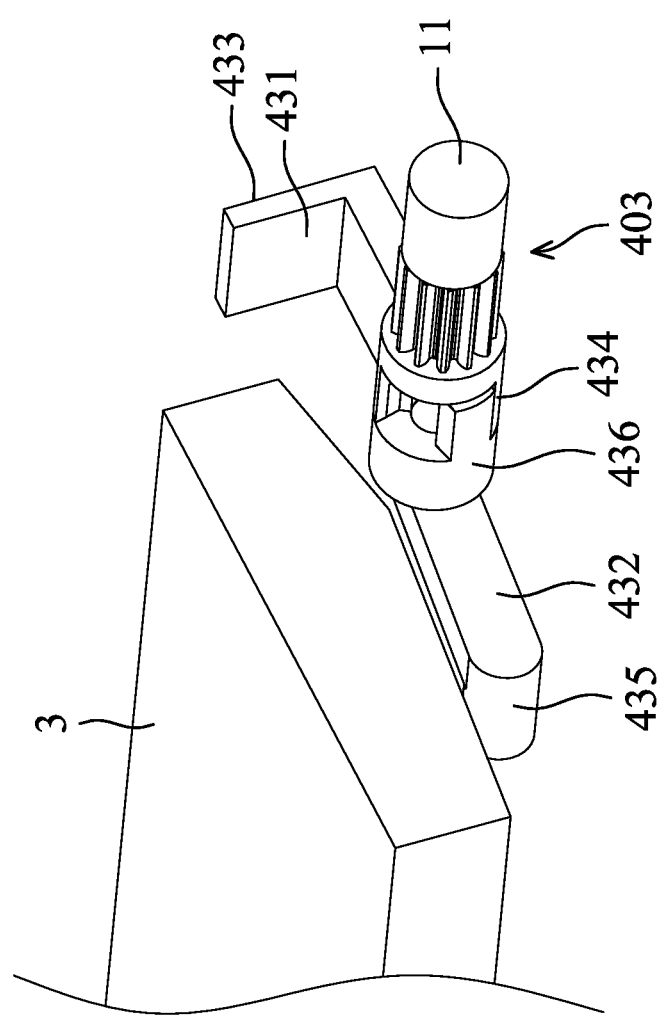
FIG. 4B shows details of the orientation adjustment mechanism of the third embodiment of the invention, wherein the cover is in the third cover orientation relative to the device body.
Figure 4C:
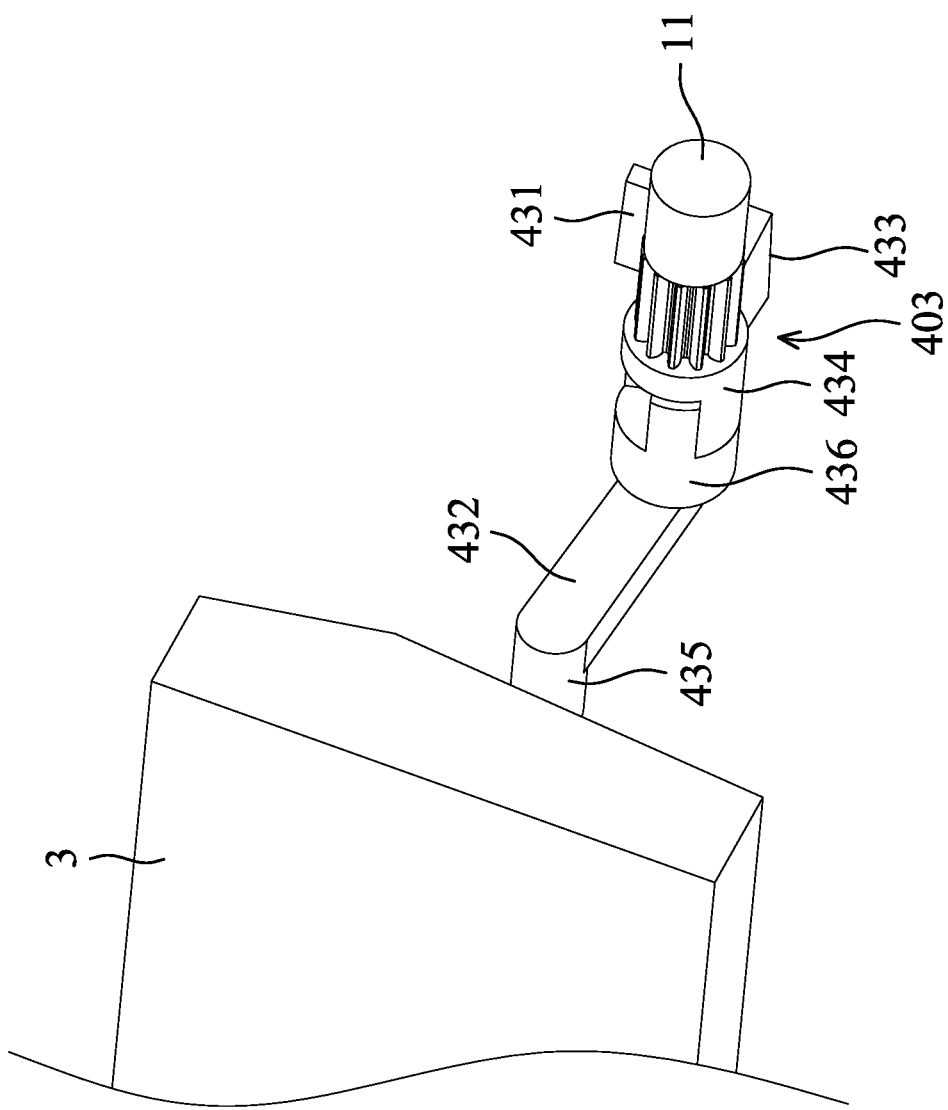
FIG. 4C shows details of the orientation adjustment mechanism of the third embodiment of the invention, wherein the cover is in the second cover orientation relative to the device body.

FIGS. 4A, 4B and 4C show the orientation adjustment mechanism 403 of a third embodiment of the invention. With reference to FIGS. 4A, 4B and 4C, in one embodiment, the orientation adjustment mechanism 403 includes a first push member 431 and a second push member 432. The device body 1 includes a shaft 11. The first push member 431 pivots on the shaft 11. The first push member 431 includes a push member connection end 433 and a first push portion 434. The push member connection end 433 is connected to the cover 2. The second push member 432 includes a push member abutting end 435 and a second push portion 436. The push member abutting end 435 abuts the auxiliary display unit 3. The first push portion 434 is adapted to push the second push portion 436 and rotate the second push member 432. In this embodiment, the first push member 431 and the second push member 432 are rotated around an axis of the shaft 11.

With reference to FIGS. 4A, 4B and 4C, in one embodiment, while the cover 2 is being rotated relative to the device body 1 from the first cover orientation (FIG. 4A) to the third cover orientation (FIG. 4B), the first push portion 434 does not push the second push portion 436, and the first push portion 434 therefore does not push the auxiliary display unit 3. While the cover 2 is being rotated relative to the device body 1 from the third cover orientation (FIG. 4B) to the second cover orientation (FIG. 4C), the first push portion 434 pushes the second push portion 436 to rotate the second push member 432, and the push member abutting end 435 pushes the auxiliary display unit 3 to the second unit orientation.

Figure 5A:
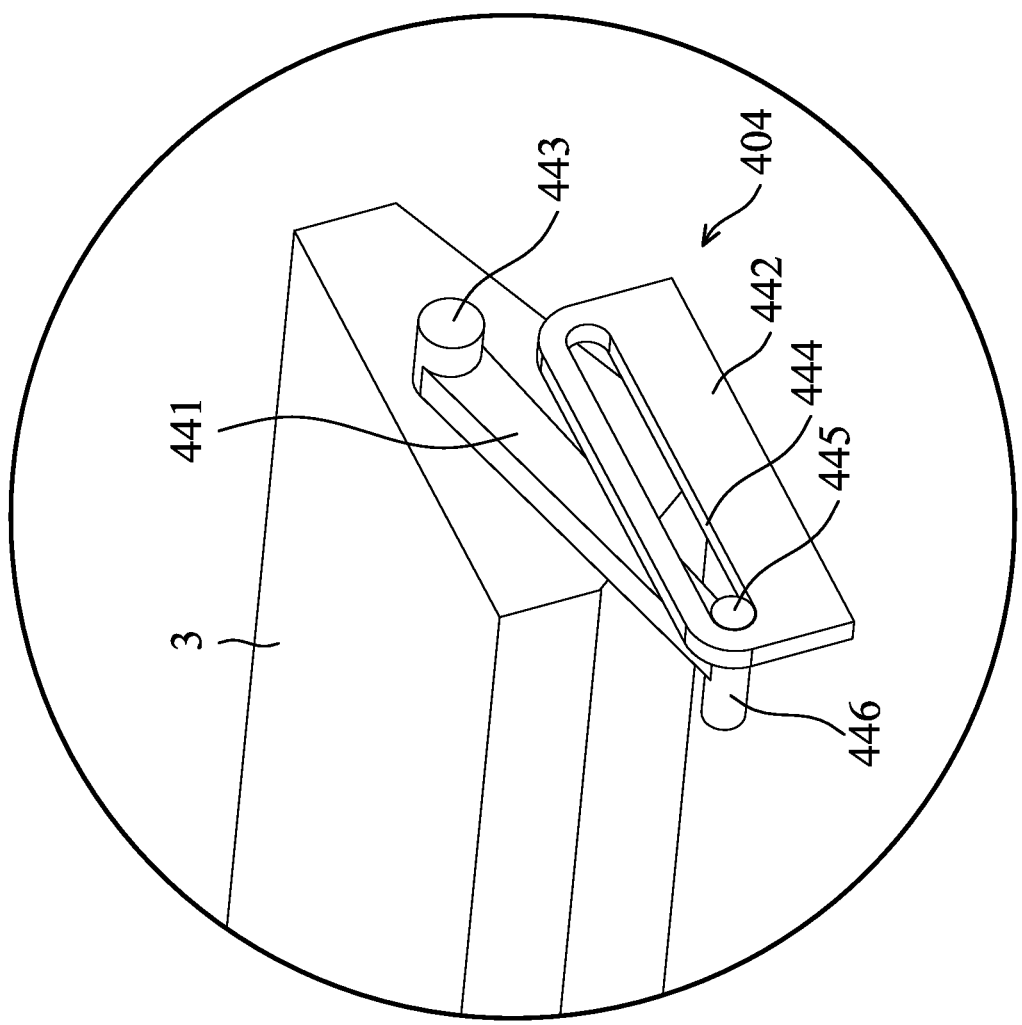
FIG. 5A shows details of the orientation adjustment mechanism of the fourth embodiment of the invention, wherein the cover is in the first cover orientation relative to the device body.
Figure 5B:
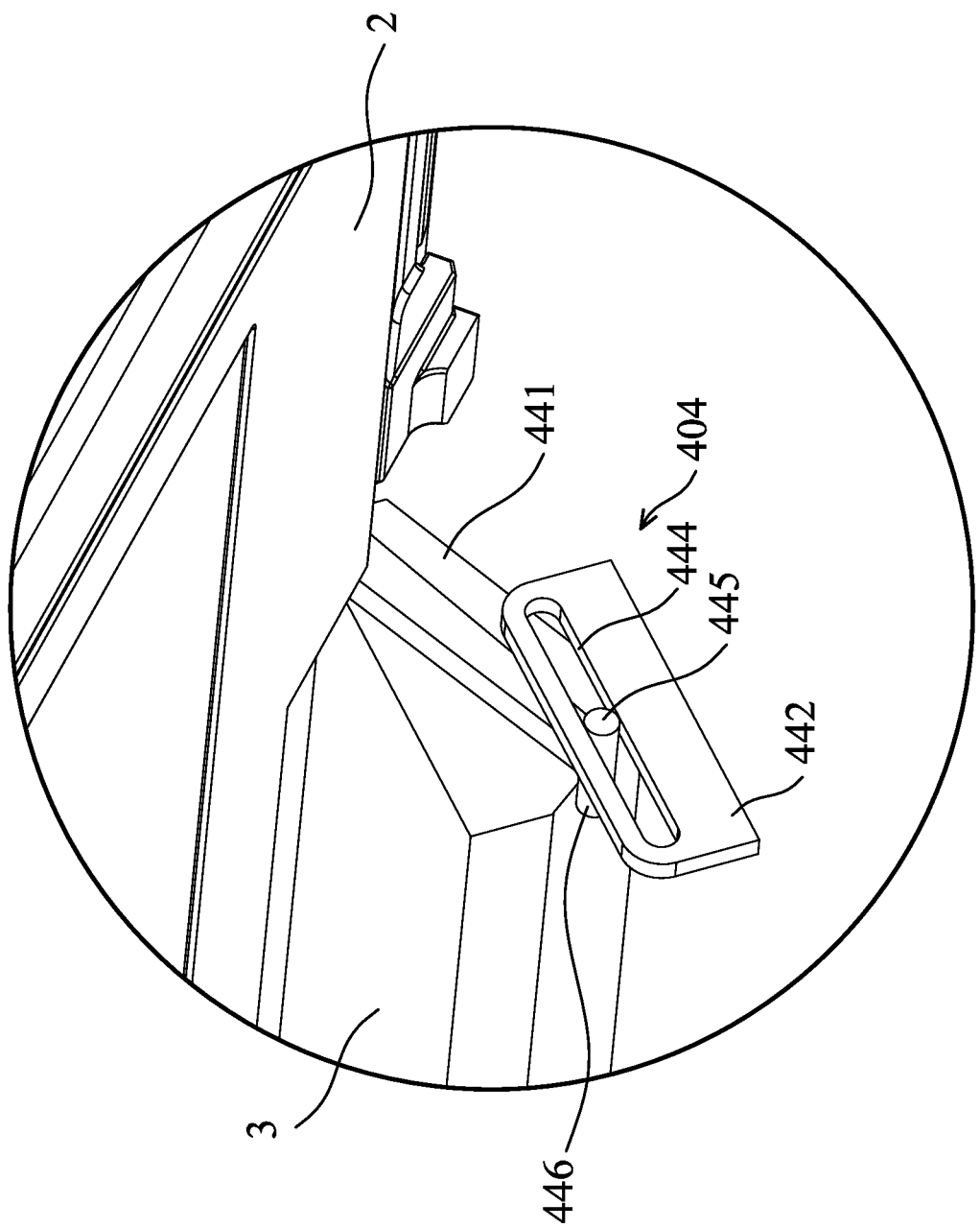
FIG. 5B shows details of the orientation adjustment mechanism of the fourth embodiment of the invention, wherein the cover is in the third cover orientation relative to the device body.
Figure 5C:
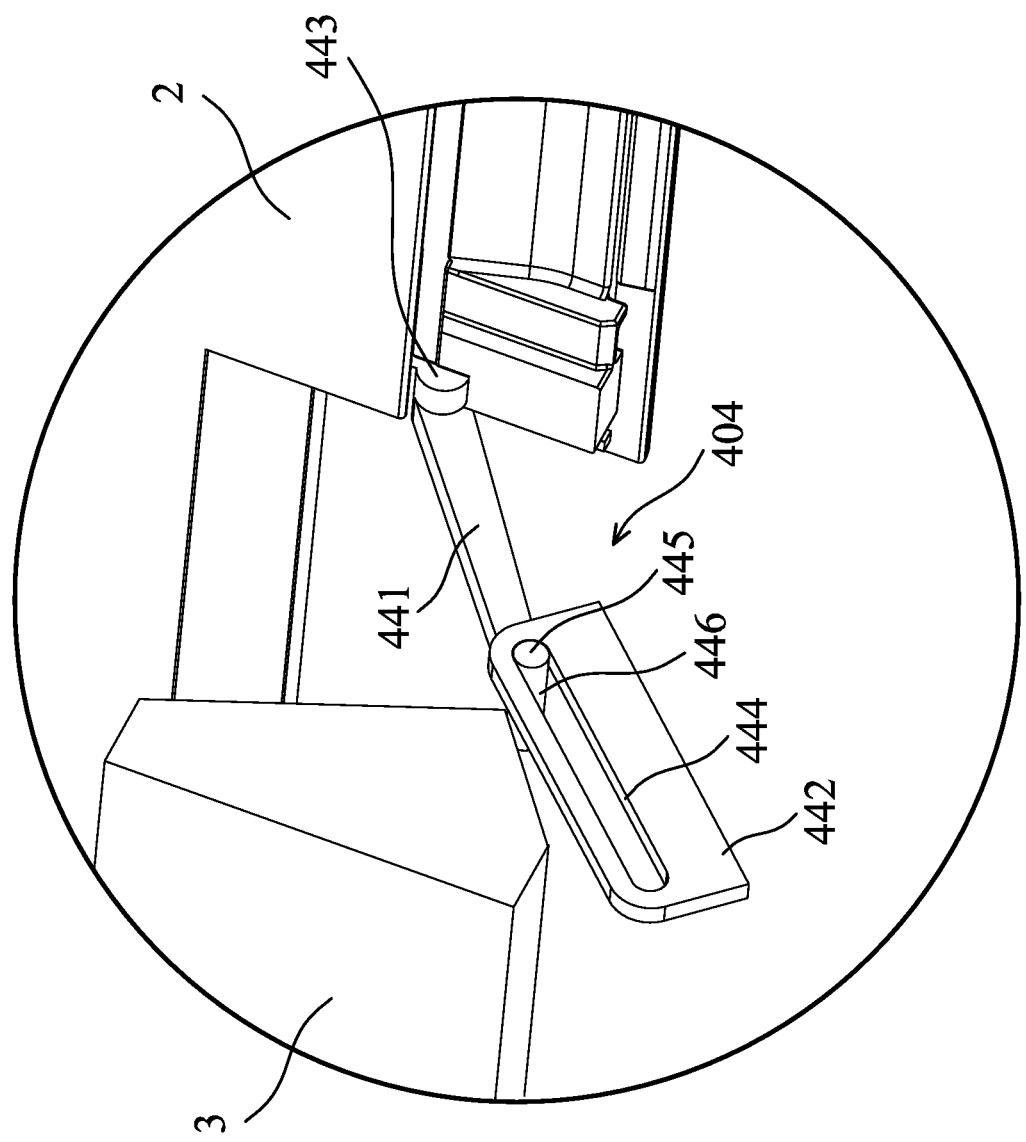
FIG. 5C shows details of the orientation adjustment mechanism of the fourth embodiment of the invention, wherein the cover is in the second cover orientation relative to the device body.

FIGS. 5A, 5B and 5C show the orientation adjustment mechanism 404 of a fourth embodiment of the invention. With reference to FIGS. 5A, 5B and 5C, in one embodiment, the orientation adjustment mechanism 404 includes a rotation rod 441 and a restriction plate 442. A pivot end 443 of the rotation rod 441 pivots on the cover 2. The restriction plate 442 is disposed on the device body 1. The restriction plate 442 includes a groove 444. The other end of the rotation rod 441 has a guiding pillar 445 and an abutting pillar 446. The guiding pillar 445 slides in the groove 444, and the abutting pillar 446 is adapted to push the auxiliary display unit 3.

With reference to FIGS. 5A, 5B and 5C, in one embodiment, while the cover 2 is being rotated relative to the device body 1 from the first cover orientation (FIG. 5A) to the third cover orientation (FIG. 5B), the guiding pillar 445 slides in the groove 444, and the abutting pillar 446 does not push the auxiliary display unit 3. While the cover 2 is being rotated relative to the device body 1 from the third cover orientation (FIG. 5B) to the second cover orientation (FIG. 5C), the guiding pillar 445 slides in the groove 444, and the abutting pillar 446 pushes and rotates the auxiliary display unit 3.

Utilizing the clamshell electronic device of the embodiment of the invention, when the cover is closed, the user can obtain such information as the time, weather or messages from the auxiliary display unit via the cover notch. Additionally, when the cover is opened (for example, the cover is in the second cover orientation relative to the device body), the user can also obtain such information as the time, weather or messages directly from the auxiliary display unit without switching the windows in the screen.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clamshell electronic device, comprising:
    a device body;
    a cover, wherein the cover pivots on the device body, and the cover comprises a cover notch;
    an auxiliary display unit, disposed on the device body, wherein the auxiliary display unit is adapted to be rotated between a first unit orientation and a second unit orientation;
    an orientation adjustment mechanism, connected to the cover and the auxiliary display unit, wherein when the cover is in a first cover orientation relative to the device body, the cover covers the device body, and the auxiliary display unit is in the first unit orientation and is exposed by the cover notch,
    wherein while the cover is being rotated relative to the device body from the first cover orientation to a second cover orientation, the cover moves the orientation adjustment mechanism, and the orientation adjustment mechanism rotates the auxiliary display unit to the second unit orientation,
    wherein while the cover is being rotated relative to the device body from the first cover orientation to a third cover orientation, the auxiliary display unit is not rotated by the orientation adjustment mechanism, and while the cover is being rotated relative to the device body from the third cover orientation to the second cover orientation, the orientation adjustment mechanism rotates the auxiliary display unit to the second unit orientation, wherein the third cover orientation is located between the first cover orientation and the second cover orientation.

2. The clamshell electronic device as claimed in claim 1, wherein the orientation adjustment mechanism comprises a first gear, a second gear, a third gear and a linkage, the auxiliary display unit comprises a unit slot, the cover moves the first gear, the first gear rotates the second gear, the second gear rotates the third gear, the third gear moves the linkage, the linkage comprises a post, and the post is inserted into the unit slot.

3. The clamshell electronic device as claimed in claim 2, wherein the unit slot comprises a first slot section and a second slot section, and while the cover is being rotated relative to the device body from the first cover orientation to the third cover orientation, the post is moved in the first slot section, and while the cover is being rotated relative to the device body from the third cover orientation to the second cover orientation, the post is moved in the second slot section and pushes the second slot section to rotate the auxiliary display unit to the second unit orientation.

4. The clamshell electronic device as claimed in claim 2, wherein the orientation adjustment mechanism further comprises a connection plate and a transmission plate, wherein the first gear, the second gear and the third gear are connected to the connection plate, the device body comprises a shaft, the shaft pivots on the first gear, the cover is connected to the transmission plate, and the transmission plate is connected to the first gear and rotates the first gear.

5. The clamshell electronic device as claimed in claim 1, wherein the orientation adjustment mechanism comprises a pushing rod, the device body comprises a shaft, the pushing rod pivots on the shaft, the pushing rod comprises a pushing rod connection end and a pushing rod abutting end, the pushing rod connection end is affixed to the cover, and the pushing rod abutting end is adapted to push the auxiliary display unit.

6. The clamshell electronic device as claimed in claim 5, wherein the auxiliary display unit comprises a unit surface, and while the cover is being rotated relative to the device body from the first cover orientation to the third cover orientation, the pushing rod abutting end is separated from the unit surface, and while the cover is being rotated relative to the device body from the third cover orientation to the second cover orientation, the pushing rod abutting end abuts the unit surface and pushes the unit surface to rotate the auxiliary display unit to the second unit orientation.

7. The clamshell electronic device as claimed in claim 1, wherein the orientation adjustment mechanism comprises a first push member and a second push member, the device body comprises a shaft, the first push member pivots on the shaft, the first push member comprises a push member connection end and a first push portion, the push member connection end is connected to the cover, the second push member comprises a push member abutting end and a second push portion, the push member abutting end abuts the auxiliary display unit, and the first push portion is adapted to push the second push portion and rotate the second push member.

8. The clamshell electronic device as claimed in claim 7, wherein while the cover is being rotated relative to the device body from the first cover orientation to the third cover orientation, the first push portion does not push the second push portion, and while the cover is being rotated relative to the device body from the third cover orientation to the second cover orientation, the first push portion pushes the second push portion to rotate the second push member, and the push member abutting end pushes the auxiliary display unit to the second unit orientation.

9. The clamshell electronic device as claimed in claim 1, wherein the orientation adjustment mechanism comprises a rotation rod and a restriction plate, a pivot end of the rotation rod pivots on the cover, the restriction plate is disposed on the device body, the restriction plate comprises a groove, the other end of the rotation rod has a guiding pillar and an abutting pillar, the guiding pillar slides in the groove, and the abutting pillar is adapted to push the auxiliary display unit.

10. The clamshell electronic device as claimed in claim 9, wherein while the cover is being rotated relative to the device body from the first cover orientation to the third cover orientation, the guiding pillar slides in the groove, and the abutting pillar does not push the auxiliary display unit, and while the cover is being rotated relative to the device body from the third cover orientation to the second cover orientation, the guiding pillar slides in the groove, and the abutting pillar pushes and rotates the auxiliary display unit.

11. The clamshell electronic device as claimed in claim 1, wherein the auxiliary display unit comprises an auxiliary display, the cover comprises a main display, and when the cover is in the first cover orientation relative to the device body, the auxiliary display faces a first direction, the main display faces a second direction, and the first direction is opposite to the second direction.

* * * * *